C. G. CROSSE.
Elevators for Harvesters.
No. 147,483. Patented Feb. 17, 1874.
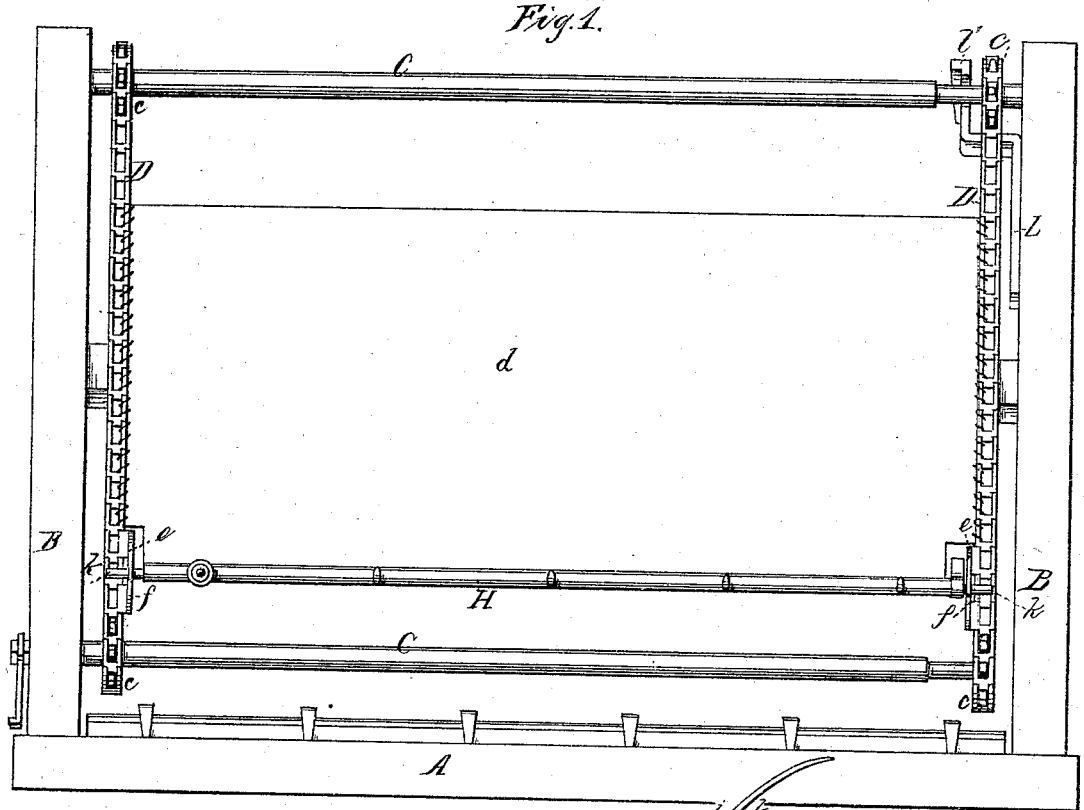
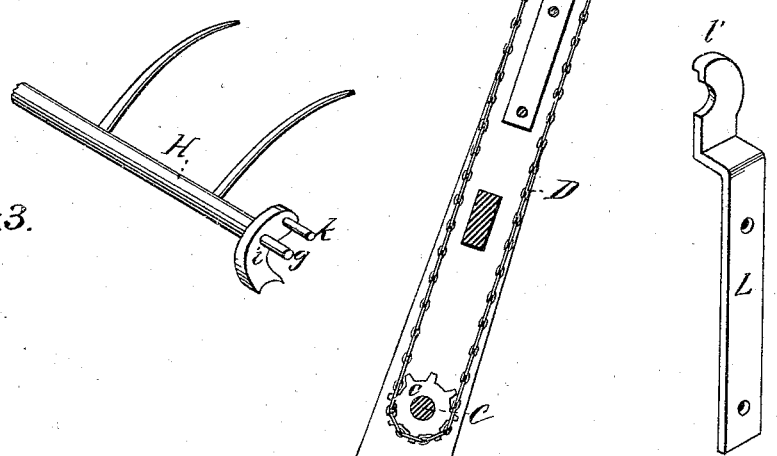

UNITED STATES PATENT OFFICE.

CHARLES G. CROSSE, OF SUN PRAIRIE, WISCONSIN.

IMPROVEMENT IN ELEVATORS FOR HARVESTERS.

Specification forming part of Letters Patent No. 147,483, dated February 17, 1874; application filed October 20, 1873.

*To all whom it may concern:*

Be it known that I, C. G. CROSSE, of Sun Prairie, county of Dane and State of Wisconsin, have invented certain new and useful Improvements in Self-Adjusting Rakes and Elevators, of which the following is a specification:

This invention relates to a self-adjusting rake and elevator to be used upon harvesters, and for similar purposes; and it consists in a rake-head hung eccentrically in plates attached to two endless chains passing over sprocket-wheels, and provided with lug-braces for changing the position of the rake-head when at the highest and lowest points in the revolution of the chains, so that, as the rake-head reaches its lowest point, the teeth are thrown into position to elevate the load, and as it reaches its highest point the position of the teeth is reversed, so as to discharge the load.

In the accompanying drawing, Figure 1 represents a front elevation of my improved rake and elevator. Fig. 2 is a transverse vertical section. Fig. 3 is a perspective view of a portion of the rake head and teeth. Fig. 4 is a detached view of a bar attached to one of the standards.

A represents a sill, to the ends of which are attached the lower ends of two inclined standards, B B, in the lower and upper portions of which are journaled two shafts, C C, each of which carries two sprocket-wheels, $c\ c$, located near the standards B B. Passing around these sprocket-wheels are two endless chains, D D, to which is attached an apron, $d$, the length of which may be somewhat less than half the length of each of the chains. Attached to the two chains, at points near the lower edge of the apron, are two plates, $e\ e$, which are secured to the links of the chain in such a manner as to project outward at right angles with the apron. At a short distance from the plates $e\ e$, and secured to the links in a similar manner, are two lug-braces, $f\ f$, having notches in the edges which are toward the plates $e\ e$. The rake-head H has gudgeons $g$ at the ends, and also has arms $i$ attached to said ends, which arms are provided with crank-pins $k$. One of the arms $i$ (see Fig. 3) is elongated, and has at the end opposite the crank-pin a curved depression, for engagement with the rounded upper end $l'$ of a bar, L, which is attached to one of the standards B. The rake-head is hung eccentrically in the chains by inserting the crank-pins $k$ in the plates $e$.

When the portions of the chains to which the rake-head is attached are traveling between the shafts C C, either ascending or descending, the notched braces $f\ f$ engage with the gudgeons $g\ g$, and thus hold the rake-head steady, with the teeth extending outward at right angles with the line of travel of the chains; but, when passing around the sprocket-wheels, the braces $f\ f$ are disengaged from the gudgeons, as shown in Fig. 2. When the rake-head reaches the lowest point in its descent, in passing under the lower shaft C, the teeth assume a nearly-horizontal position, which is retained, by means of the engagement of the gudgeons $g$ and braces $f$, until they reach the highest point, when they are reversed, as shown in Fig. 2, so as to deposit the load, said reversal being assisted by the engagement of the curved depression in the arm $i$ with the rounded upper end $l'$ of the bar L.

I claim as my invention—

The combination of the eccentrically-hung rake-head H, plates $e\ e$, braces $f\ f$, and endless chains D D, substantially as and for the purpose set forth.

In testimony that I claim the foregoing as my invention I hereunto affix my signature this 3d day of October, 1873.

CHARLES GILES CROSSE.

Witnesses:
 WM. E. ANGELL,
 C. S. CROSSE.